United States Patent

[11] 3,618,116

[72] Inventors Anthony C. Jr. LaMartina
Massapeque, N.Y.;
Floyd L. Malmborg, Brookfield Center, Conn.
[21] Appl. No. 839,553
[22] Filed July 7, 1969
[45] Patented Nov. 2, 1971
[73] Assignee American District Telegraph Company
Jersey City, N.J.

[54] SIGNAL-RECORDING UNIT
12 Claims, 11 Drawing Figs.
[52] U.S. Cl. .................................... 346/59, 346/79, 346/136
[51] Int. Cl. .................................... G08b 25/00
[50] Field of Search .................................... 346/59, 60, 79, 93, 136; 178/6.6, 4, 4.1; 179/5

[56] References Cited
UNITED STATES PATENTS
2,129,762  9/1938  Harrison .................... 346/59
2,944,867  7/1960  Gregory .................... 346/59
3,004,817  10/1961  Wapner .................... 346/59 X
3,478,202  11/1969  Snodgrass .................... 346/33 X

Primary Examiner—Joseph W. Hartary
Attorney—Charles B. Smith

ABSTRACT: A recorder for recording signals at a central station transmitted to said central station from remote stations, the recorder including a housing, tape supply and takeup spools, motors for feeding the tape and driving the takeup spool, a plurality of signal-receiving means each having means for receiving signals from a remote station, means on the signal-receiving means for recording signals received thereby on the tape, means for recording the date and time on the tape that the signal is received, means for feeding the tape while signals are being received and for continuing such feed for a predetermined time thereafter, and means for supplying current to the feeding and driving motors from an alternating current source when such source is available and from a direct current source when the alternating current source fails.

SIGNAL-RECORDING UNIT

This invention relates to a recorder for recording and visually displaying coded signals transmitted to the recorder from remote stations and, more particularly, to such a recorder for intermittent operation for printing and recording such coded signals on a tape with reference to a date and time indicia recorded on the tape simultaneously with the coded signal.

There are numerous installations where signals initiated automatically, or manually, at a remote station are transmitted to a central station and, when such signals are received, appropriate action with respect to the type of signal received, must be taken. For example, a plurality of remote stations may each be provided with a burglar or fire alarm system, watchman stations, or similar systems connected by, for example, telephone wires, to a central station. On the occurrence of a forced entry, fire, or failure of a watchman to punch a clock at the required time at one of the remote stations, a signal is generated or, in the case of the watchman, fails to be generated and the signal or lack of signal is noted at a central station to which the remote stations are connected by private wire, telephone wire, or the like. Each station may be connected to an individual receiver at the central station or each remote station may be identified by a code transmitted to the central station.

When a signal is received at the central station from a remote station, some action on the part of the central station might be required. For example, if the signal received from the remote station indicated forced entry or fire at the remote station, it would be necessary for the central station to dispatch police or fire equipment, as the case may be, to the remote station from which the signal is received. In addition to dispatching police or fire equipment to the remote station, it is also desirable that the signal, and the date and time that the signal is transmitted, be recorded at the central station. It is desirable that this recorded information be available to the central station operator so that he might readily identify the remote station sending the signal and the time and cause of such signal.

Various attempts have heretofore been made to provide central station recorders which, when a signal is received, will record and store such signal for reference. In one such recorder, a paper tape is driven from one spool to another past sensing devices which, in response to a signal from a remote station, record the signal on the tape In such instrument, the tape is driven constantly and continues to pass through the machine irrespective of any signal from the remote stations to which such recorder is connected. Thus, many feet of tape may be driven through the machine without any signal being received. Not only is the tape, being driven through the machine while no signals are being received, wasted but, in addition, large volumes of tape are required which, after they pass through such machine, must be stored and, if subsequently unrolled and read, consume time.

Various attempts have also been made to provide such a recorder which is driven only at the time that a signal is received at the central station. This has, of course, substantially reduced the amount of tape that the machine requires, has reduced tape storage and has made the tape more readily readable should it be necessary to unwind and read such tape. One difficulty which has been encountered with such intermediate operating recorders, however, has been the starting up of the recorder when the signal is received. Due to the time required for such a machine to start and commence feed of the tape, the initial signal received from the remote station may be printed on the tape before the tape is at the required driving speed. Thus, the signal impulses are printed on the tape one over the other or not at the required intervals. The reading of such a signal on such tape becomes difficult, if not impossible. Furthermore, after the signal is received and printed, such print may not be in position where it can be viewed.

Under the present invention, a recorder for recording signals from a plurality of remote stations, or remote channels, is provided in which, on receiving a signal to be recorded from a remote station, or channel, records such signal, as well as the time and date of the signal, on a paper tape. The recorder motors are then energized to drive the tape. The motors which are energized simultaneously with the recording of the first signal bring the tape up to driving speed, instantaneously, so that the second signal, and subsequent signals recorded on such tape, as the tape drive continues, are imprinted on the tape, together with date and time imprints, at equal intervals. Through time delay in the motor circuit, the motors continue to drive the tape for a preset time interval, after the last signal to be recorded has been received by the recorder and recorded. Thus, after the last signal is recorded, the motors continue to drive the tape so that, when the motors and tape stop, the last recorded signal, imprinted on the tape, is exposed and can be viewed from the front of the machine.

Under normal conditions, the recorder of the instant invention is powered from line voltage available in the area, for example, 110-volt, 60-cycle, AC. In the event of failure of line power, such as power failure at the central station or in the central station location, the recorder includes batteries and an inverter which, during power failure are automatically connected to the drive motor circuit to drive the motors during such power failure, as such drive becomes necessary because of signals received from remote stations or channels. The recorder channels may be adapted for any power, more commonly 24- or 48-volt DC power, generally employed in remote-central station detector equipment.

The invention of the present application will be more clearly understood from the following description and appended drawings in which:

Referring to FIGS. 1 and 2, the recorder, generally designated 2, has a front face cover 4 slidably mounted in housing 6 and is provided with a handle 8 for sliding face cover 4 into and out of housing 6. Roller 10 is mounted in slot 12 in front cover 4 and roller 14 is mounted in slot 16. Tape 18, as will be later described, passes through slot 12, around rollers 10, 14 and through slot 16, the tape moving in the direction of the arrow, FIGS. 1 and 2. When closed, face cover 4 may be locked, by lock 20, with a key, not shown. Cover 4 is provided with a rewind button 22 and test button 24, for purposes later described. Support plate 26 is mounted on the back of cover 4 and is affixed thereto for movement into and out of housing 6 as face cover 4 is pulled out of and moved back into housing 6 with handle 8.

Figure 1:
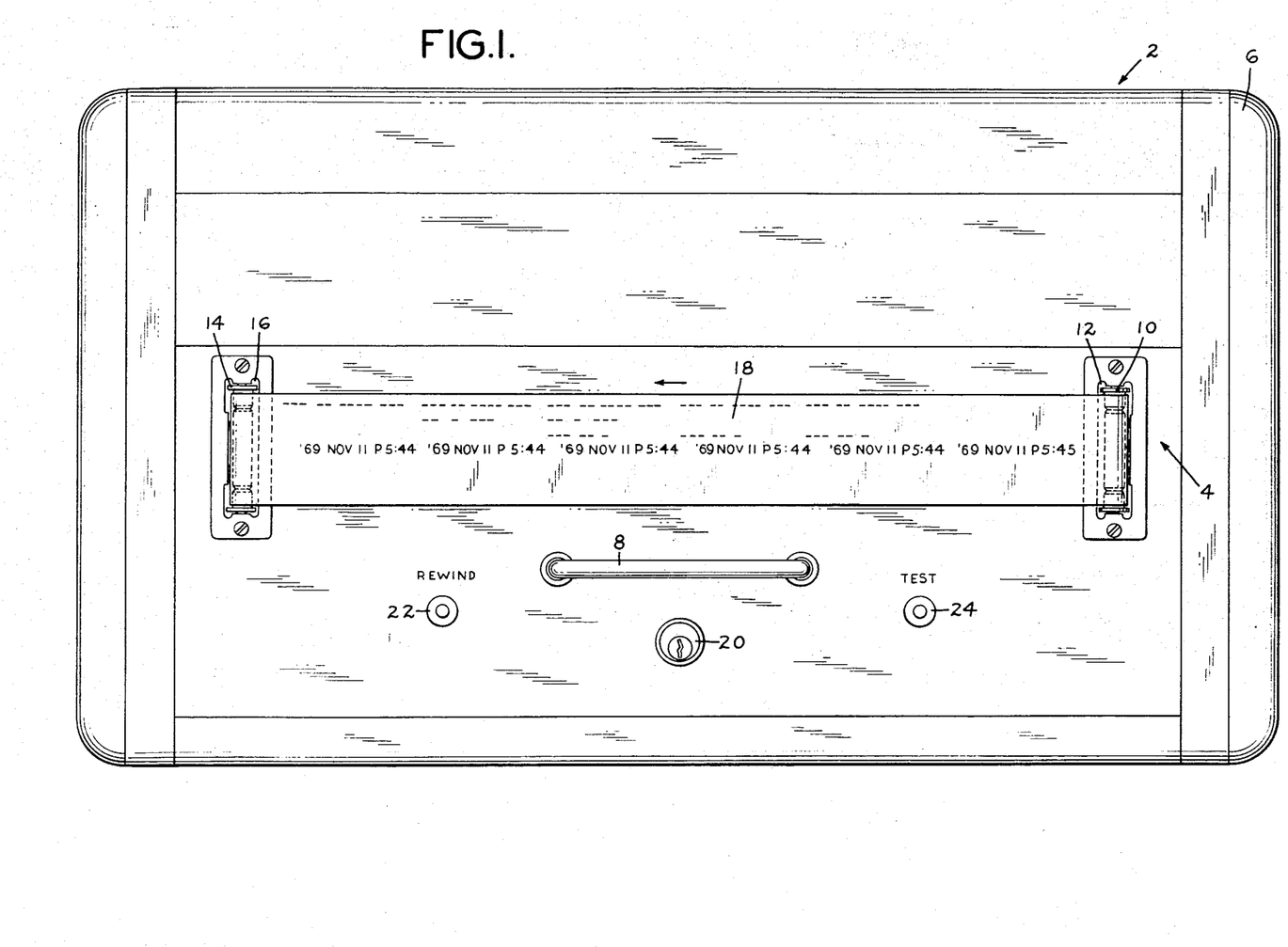
FIG. 1 is a front elevational view showing the front of the recorder.
Figure 2:
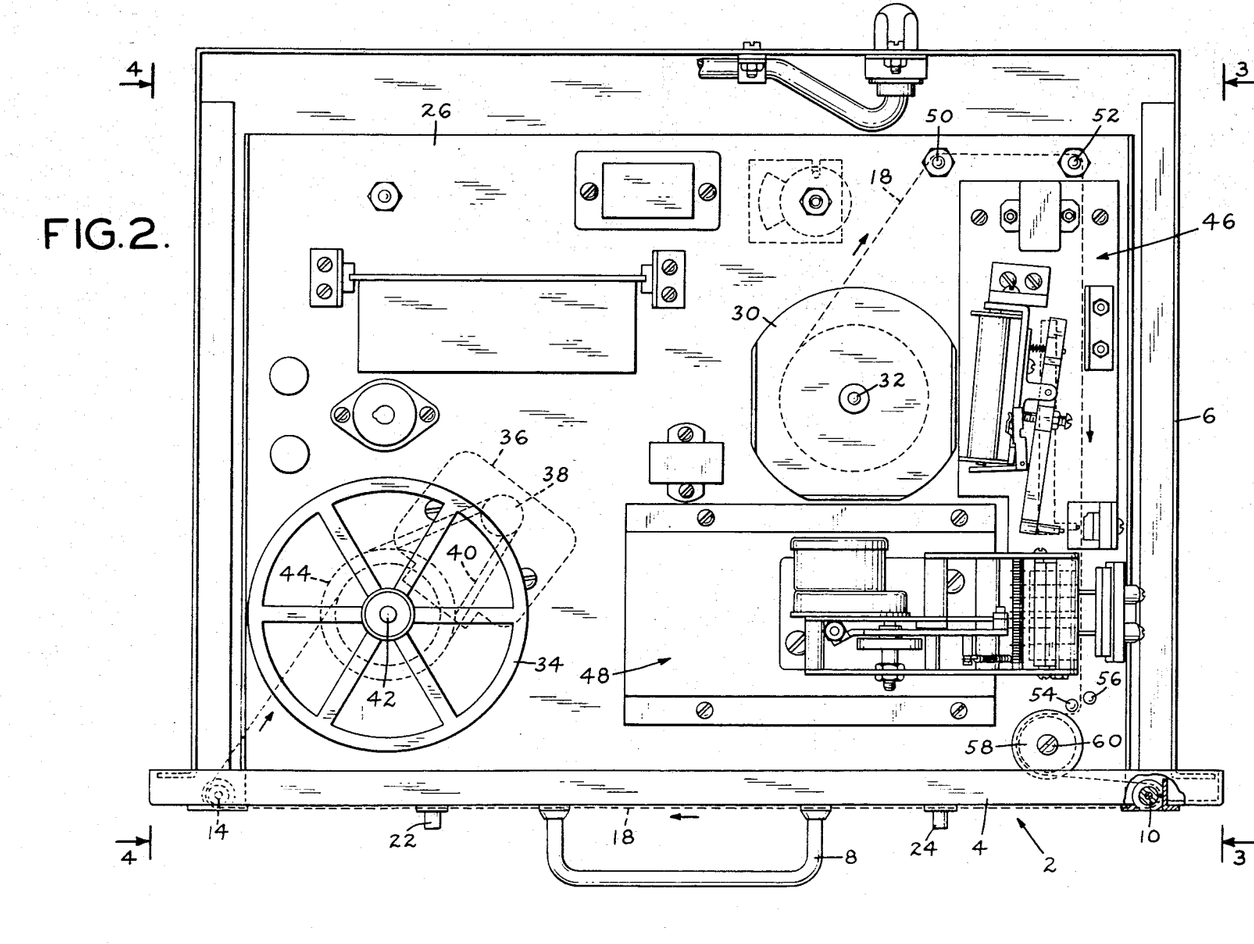
FIG. 2 is a top plan view of the recorder of the instant invention, with the top cover removed.
Figure 3:
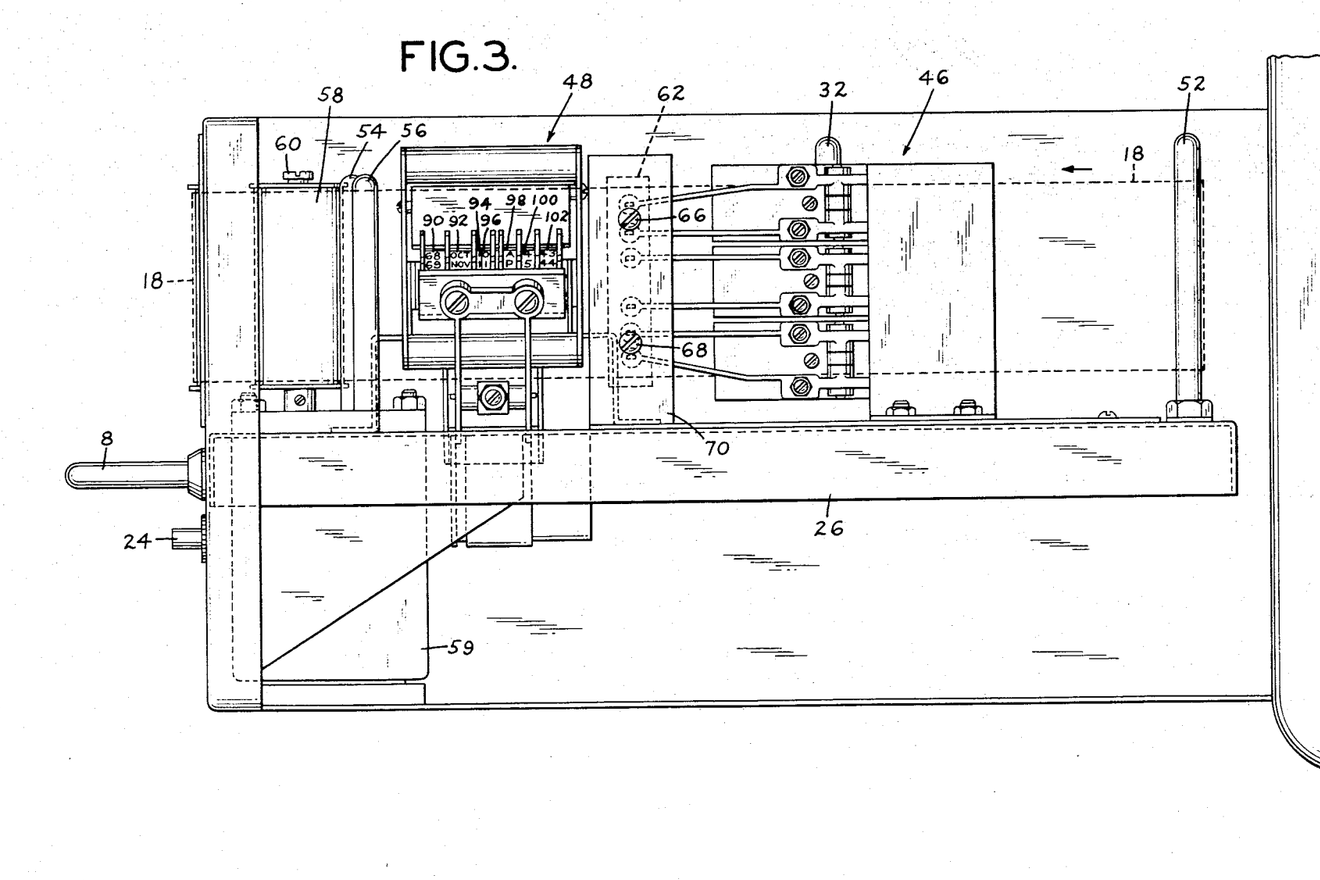
FIG. 3 is a side view taken at 3—3, FIG. 2.
Figure 4:
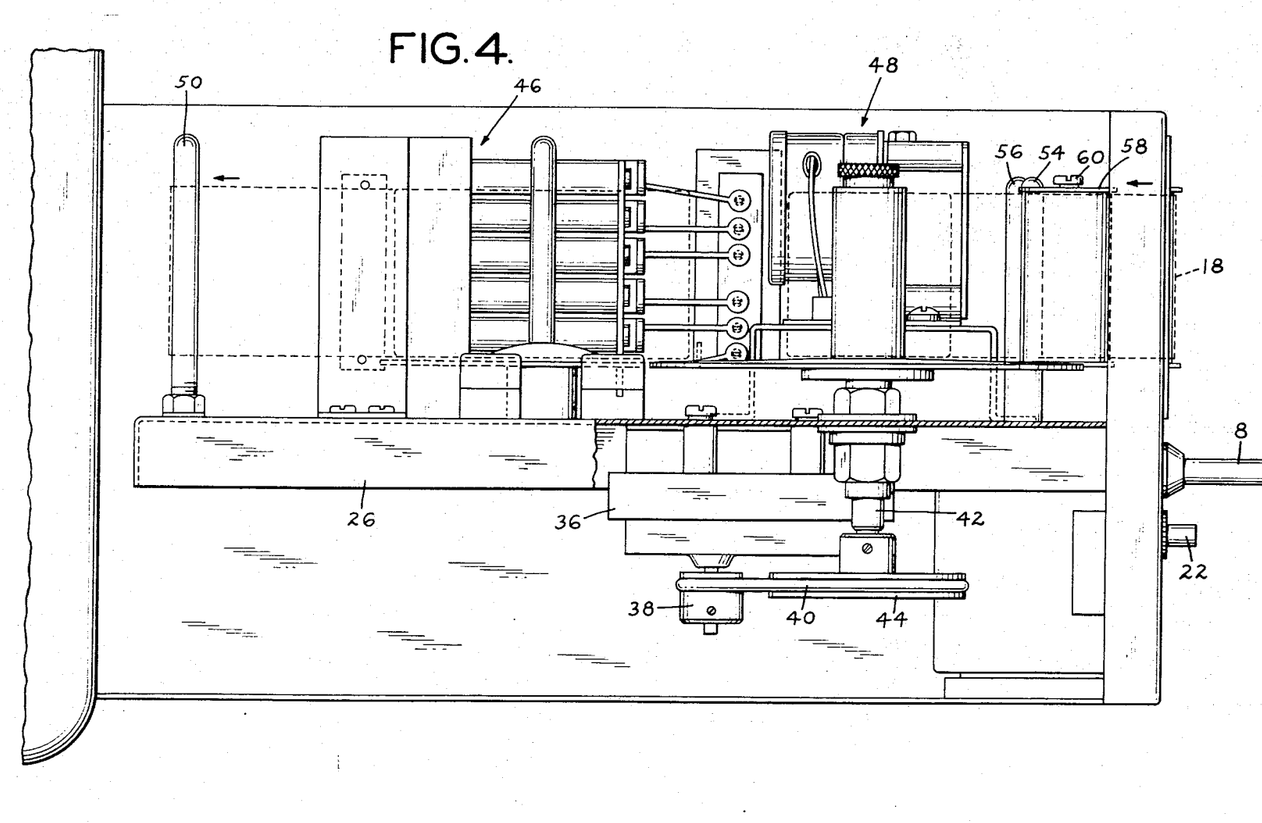
FIG. 4 is a side elevational view taken at 4—4, FIG. 2.
Figure 5:
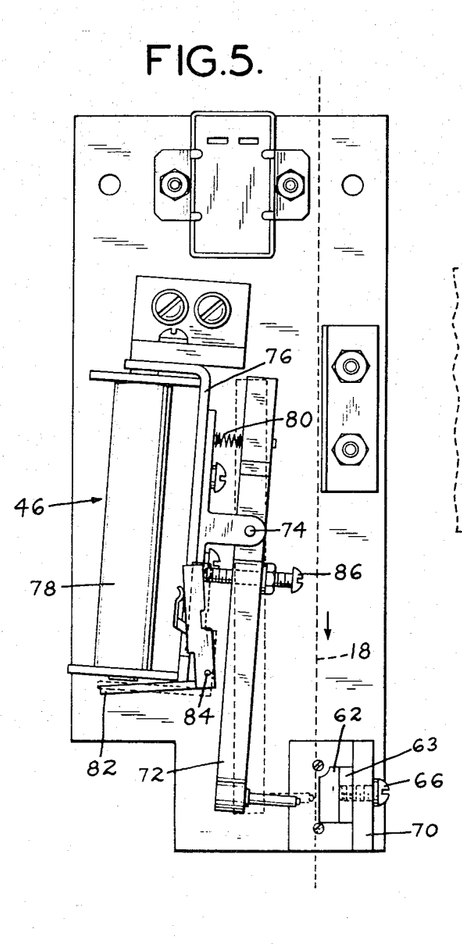
FIG. 5 is a top plan view of the signal-printing unit of FIG. 2.
Figure 6:
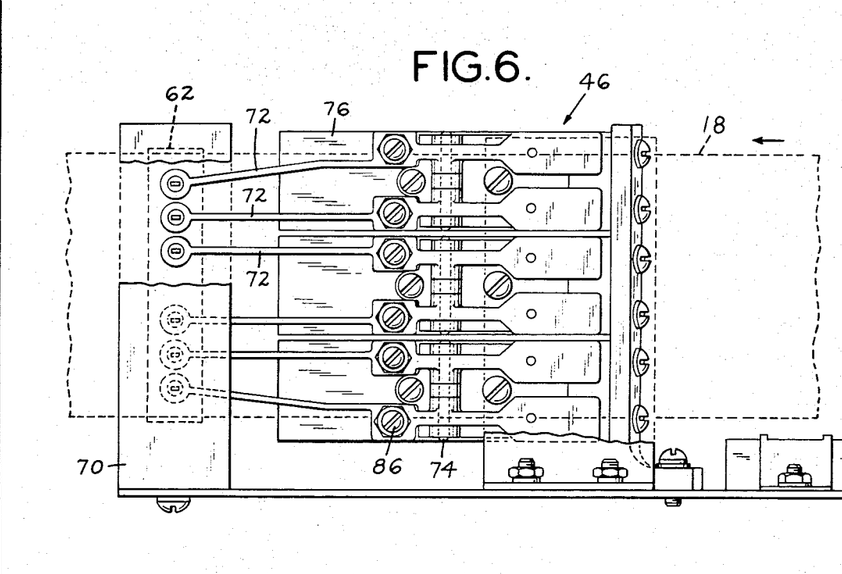
FIG. 6 is a side elevational view, partly broken away, of the signal-printing unit of FIG. 5.

Tape supply spool 30 is rotatably mounted on pin 32, affixed to plate 26, and tape takeup spool 34, driven by motor 36, through motor shaft 38 and belt 40, is keyed to shaft 42 mounted for rotation on plate 26. Pulley 44 is fixed to shaft 42 and, through belt 40, motor shaft 38 and motor 36 drives pulley 34 to takeup tape 18 when takeup spool 34 is driven in the manner later described. A signal-printing unit, generally designated 46 and -time and a date-recording unit, generally designated 48, are mounted on plate 26. From tape supply spool 30, tape 18 passes around tape guide pins 50, 52, fixed to plate 26, through signal-printing unit 46 and time- and date-recording unit 48, between pins 54, 56, mounted on plate 26, around spool 58, rotatably mounted on plate 26 by shaft 60 driven by tape drive motor 59 and around rollers 10, 14, to tape takeup spool 34.

Tape drive motor 59 is a DC motor of the stepping type designed to advance the rotor thereof by a fixed angular amount upon the receipt of a pulse of DC current. In the present invention it is arranged to be operated by AC current, each cycle thereof, positive and negative, serving to advance the rotor by the fixed amount. Such a motor is particularly well adapted to the present purpose because of its inherent, quick-starting characteristic which moves the tape quickly and prevents the second signal pulse from being printed on top of the first.

Referring to FIGS. 3, 4, 5 and 6, the recorder embodiment herein described has six recording channels, each of which may be connected to a separate remote station or to one of a plurality of remote signal-initiating units located at one, or more, remote stations. Platen 62 of signal-printing unit 46, consisting of an ink-saturated porous plastic block, is mounted at one side of tape 18, platen 62 being mounted by cement or mounting block 63 in turn secured by screws 66, 68 to support 70 mounted on plate 26. Each channel has a mandrel 72 pivotally mounted at 74 on frame 76 of coil 78. Spring 80 urges the striking end of mandrel 72 away from platen 62 and out of engagement with paper tape 18 passing therebetween. Armature 82 of coil 78 is pivotally mounted at 84 to frame 76 and, through adjusting screw 86 pivots mandrel 72 about pivot 74, compressing spring 80, when coil 78 is energized. Each of the coils 78 of each mandrel 72 is connected to a separate signal-receiving unit, as will be later described.

Referring to FIGS. 3, 4, 7, 8 and 9, the time- and date-recording unit 48 includes a plurality of wheels 90, 92, 94, 96, 98, 100, 102, mounted for rotation on shaft 104, fixed to frame 106 and driven by motor 108. Each of the wheels 90, 92, 94, 96, 98, 100, 102 has raised, from its surface, the various components of date and time. Wheel 90 has, raised from its surface, the year; wheel 92, the month; wheels 94, 96, the day of the month; wheel 98, "A" abbreviation for AM and "P" abbreviation for PM; wheel 100, the hour; and wheel 102, the minutes Wheels 90 through 102 are driven, in conventional manner, from motor 108 and are geared so that, while driven by motor 108, are turned to continuously show the current year, month, day, AM or PM, hour and minute. When motor 108 is initially started, of course, wheels 90 through 102 are manually set to the date and time which, while motor 108 remains energized, is automatically reset and remains current.

Figure 7:
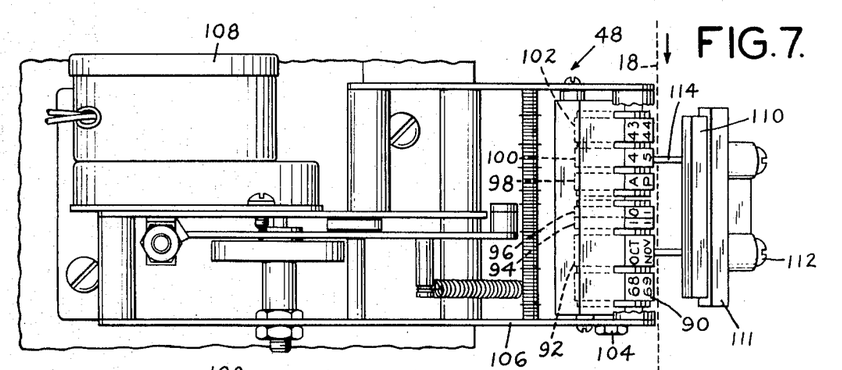
FIG. 7 is a top plan view of the time- and date-recording unit of the apparatus of FIG. 2.
Figure 8:
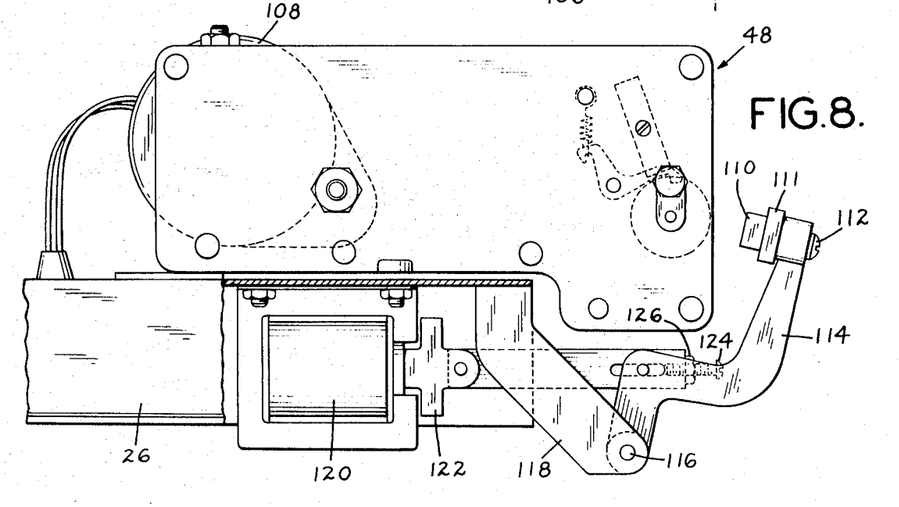
FIG. 8 is a side elevational view of the time- and date-recording unit of FIG. 7.
Figure 9:
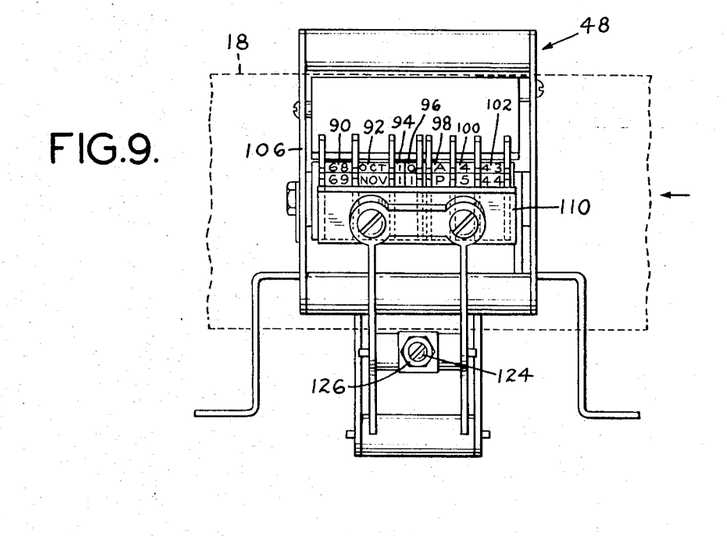
FIG. 9 is an end view of the time- and date-recording unit of FIG. 7 taken from the right-hand end of the unit, as shown in FIG. 7.

An ink-saturated, porous plastic platen 110 is cemented to mounting block 111 in turn secured by screws 112 to platen arm 114, pivotally mounted, by pin 116, on arm 118, fixed to plate 26. Solenoid 120 is mounted on plate 26 and the armature 122 of solenoid 120 is adjustably connected, by screw 124 and locking nut 126, to platen arm 114. As solenoid 120 is energized, as hereinafter described, armature 122, through screw 124 and platen arm 114 forces platen 110 into engagement with the back of paper tape 18 causing the front of tape 18 to strike the raised indicia on wheels 90 through 102, recording, on the tape, the date and time then appearing on such wheels.

Figure 10A:
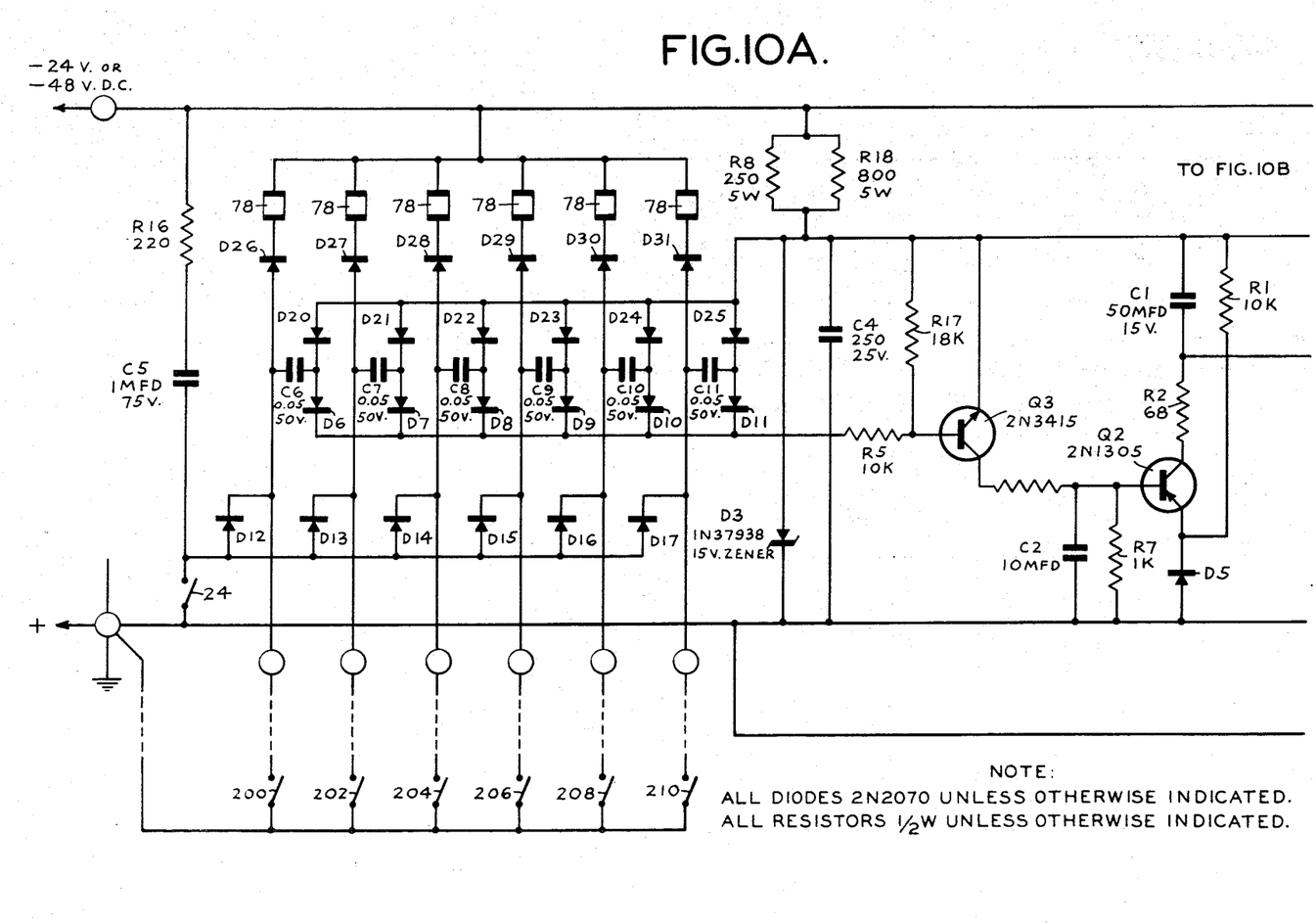
FIGS. 10A and 10B are schematic diagrams of the circuitry of the recorder of the instant invention.
Figure 10B:
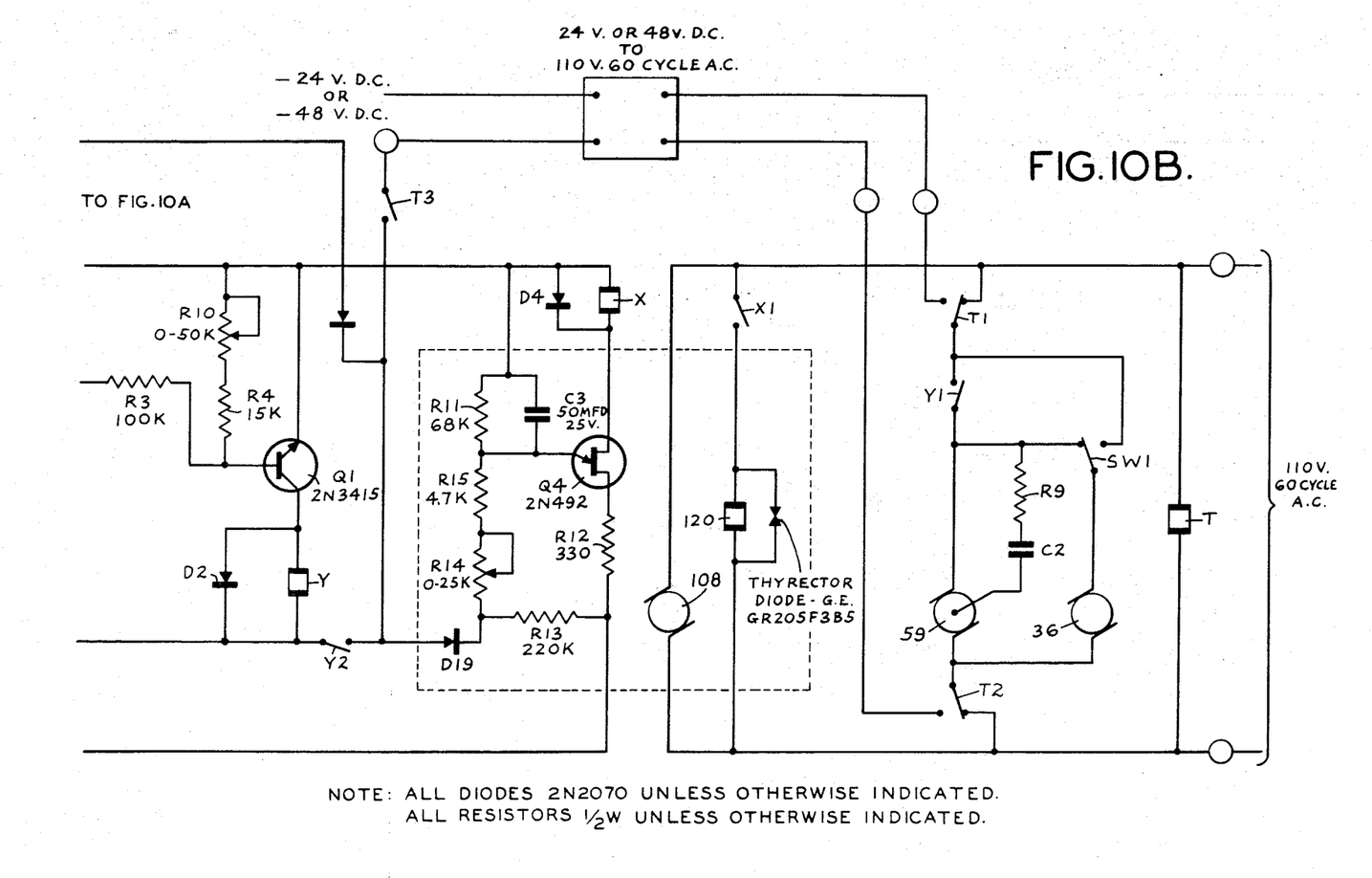

Referring next to FIGS. 10A and 10B, the circuitry of the apparatus of the instant invention is shown diagrammatically and, for purposes of convenience, the various switches, motors, relays and solenoids referred to and described hereinabove are referred to in FIGS. 10A and 10B with the same reference numerals. Tape drive motor 59 and tape takeup reel motor 36, as well as timer motor 108 and solenoid 120 are all normally driven, in the described embodiment, from 110-volt 60-cycle AC power but, upon failure of such power motors 59 and 36 are driven from a battery-powered 24-volt or 48-volt DC to 110-volt 60-cycle AC inverter, depending upon the signal supply to the printing magnets, the same batteries that power the signal supply being also used to power the inverter, for convenience. In order to conserve the battery power supply, the timer motor 108 and solenoid 120 are not operated under power emergency conditions.

A particular feature of the present invention is that the high current drain components, i.e., the three motors, solenoid and AC supervisory relay, are all operated from 120-volt AC house current under normal conditions in order to reduce the drain on the battery power supply thereby prolonging the life thereof.

In the described embodiment and the circuitry of FIGS. 10A and 10B either a 24-volt or 48-volt DC supply may be used. When a 24-volt DC supply is used for signal supply power R18, FIG. 10A, is disconnected or, when a 48-volt DC signal supply is utilized R8, FIG. 10A, is disconnected. The apparatus may, of course, be adapted for use with other DC signal supply voltages in a manner obvious to one skilled in the art. With either the R8 or R18 resistor disconnected, depending upon whether the signal supply is 24-volt or 48-volt DC, the voltage is reduced to a stable 15-volt DC through zener diode-resistor control to actuate the pulse detector and tape runout control network and the time stamp control.

When a 10–15 ms. pulse is impressed on one of the recorder coils 78, by the closing of test switch 24, or the closing of one of the switches 200, 202, 204, 206, 208 or 210 at a remote station by, for example, forced entry, fire, watchman, or other source at the remote station from which a signal is to be transmitted and recorded on recorder 2 at the central station, the appropriate coil 78 is energized causing mandrel 72 to strike paper tape 18 against inked platen 62, making a mark, or impression, on tape 18. Simultaneously with the energization of coil 78, transistor Q3 is energized and turns on amplifier transistor Q2 and transistor Q1, charging capacitor C1 and energizing relay Y. Where energized relay Y closes contacts Y1 and Y2. Contact Y1 when closed, energizes tape drive motor motor 59 and tape takeup reel motor 36, to feed tape 18. Contact Y2, when closed, charges condenser C3 on time date stamp recorder 48, through diode D19 and resistors R14 and R15 until transistor Q4 conducts and provides an impulse which energizes relay X. When energized, relay X closes contact X1, energizing solenoid 120 and time- and date-recording unit 48. When energized, solenoid 120 of recording unit 48 causes linked platen 110 to engage the back of tape 18 and causes the front of tape 18 to strike the raised indicia on wheels 90 through 102, recording, on tape 18, the date and time then appearing on wheels 90 through 102. Motor 108 is, of course, operated continuously. The rate or number of time indications printed on tape 18, by energizing solenoid 120 of time- and date-recording unit 48, can be varied by adjusting potentiometer R14. The cycling rate would normally be so adjusted that at least one impression will always be visible on the length of tape displayed across the front of the recorder. The practical advantage thereof lies in avoiding the need to pull a length of tape off the takeup reel to locate a time signal.

Capacitor C1 is immediately charged when Q3 detects a signal pulse, either from the closing of one of the remote switches 200 through 210, or the closing of test switch 24. When such signal pulse terminates, capacitor C1 starts to discharge and, when discharged to the cutoff point of Q1 relay Y deenergizes and opens contacts Y1 and Y2, stopping all recording functions. The discharge rate of capacitor C1 is controlled by potentiometer R10 which is adjusted to delay the deenergization of relay Y for approximately 10 seconds, the time required for the last printed signal, printed on tape 18, to be driven by motors 59, 36 from platen 62 to the front of recording unit 2.

Any signal pulse rate wherein the gap between the pulses is less than 10 seconds will cause capacitor C1 to rapidly recharge thereby maintaining relay Y energized and switches Y1, Y2, closed. Thus, the tape will continued to run and, as each signal impulse is received from the closing of switches 200 through 210, or test switch 24, and appropriate impression will be made on tape 18 by the corresponding energization of appropriate coil 78. When the signal pulse is interrupted for more than 10 seconds, relay Y is, of course, deenergized and switches Y1 and Y2 are open and the tape is stopped.

The recorder of the instant invention is designated to receive discontinuous pulses from the various remote stations and, in the embodiment described, is provided with six channels. Additional channels may, of course, be added or channels may be eliminated. In addition, without adding channels, the number of stations or remote units which can be received and recorded might, if desired, be increased by assigning a particular code to each unit and by connecting more than one such coded unit to a single channel. For example, one remote unit may be coded so that when energized, it will transmit three closely spaced impulses, then delay and transmit two more closely spaced impulses, again delay and transmit four closely spaced impulses, then again delay and transmit three impulses. Another remote unit on the same or different channel may be set so that, when energized, it transmits two closely spaced impulses, then delays, transmits another impulse, again delays and transmits three impulses. There are, of course, disadvantages to connecting more than one remote unit to a single channel because, when one unit on the channel is recording at the central station, a signal from another unit could not be received or, if received, would alter the coded signal.

As aforestated, the recorder of the instant invention is designed to receive discontinuous pulses. Should a failure occur in one of the lines connected to the recorder, and cause the line to ground or one of the units at a remote station should lock in and transmit a continuous, rather than discontinuous, signal, condensers C6 through C11 in the circuitry of FIGS. 10A, 10B which are charged during normal signal pulsing, will remain charged. Such charging of condensers C6 through C11 will, on a continuous pulse, turn off Q3, turning off amplifier transistor Q2 and, after the required 10 seconds, capacitor C1 will discharge and turn off transistor Q1, deenergizing relay Y and opening switches Y1 and Y2 and turn off tape motors 59, 36, causing the recorder to stop until the line fault or locked-in signal is corrected. Although one or more channels of the recorder may be so blocked, the other channels, not blocked, will operate normally to receive and record signals.

As aforementioned, the tape motors and time motor and timer relay are normally powered from 110-volt 60-cycle source. Should such source fail the recorder of the instant invention is provided with a 24- or 48-volt DC to 115-volt AC inverter which, during normal operation on 110-volt 60-cycle power is on standby. Should there be a failure in the 110-volt 60-cycle normal power supply, relay T is deenergized and trips switches T1, T2 and closes switch T3. Thus the tape drive motors 59 and 36 are switched from the dead 110-volt 60-cycle failed power to the inverter. Although transferred from the failed 110-volt 60-cycle power to the inverter, motors 59 and 36 are not energized but are connected to the inverter so that, when a signal is received from a remote station, or from test switch 24, the received signal may be recorded on tape 18 in the normal manner. The time stamp motor 108 and solenoid 120 are isolated by the transfer of switch T2 and do not operate while the recorder is powered by the inverter. Should the failed 110-volt 60-cycle normal power supply come back on, relay T is reenergized, retrips switches T1, T2 and opens switch T3. Thus, the inverter is returned to standby and motors 59, 36, 108 and coil 120 are again powered from the 110-volt 60-cycle AC normal power supply.

Transfer contact SW1, controlled by manual switch 22 on the front face of the recorder provides a means of applying 110-volt power to the takeup reel motor 36 from the primary source under normal conditions or from the inverter under standby conditions. The purpose thereof is to provide a convenient means of rewinding a length of tape pulled off the takeup reel for examination while the recorder and takeup motor 38 are not in operation.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. A recorder for recording signals transmitted from a remote station to the recorder at a central station, said recorder including a housing, a tape supply spool, a tape takeup spool, a first electric motor means for feeding tape from said supply spool to said takeup spool, a second electric motor means for driving said takeup spool to wind said tape thereon, a plurality of signal-receiving means in said housing each having means for receiving signals transmitted thereto from a remote station, means on said signal-receiving means for simultaneously and separately recording on said tape signals received by said signal receiving means, means for recording on said tape the date and time that said signal is received by said signal-receiving means and recorded on said tape and means responsive to the signal received by said signal-receiving means for driving said first and second motor means for feeding said tape from said supply spool onto said takeup spool while signals are being received and for disconnecting said drive at a predetermined time interval after said signals are received.

2. A recorder, as recited in claim 1, in which said second motor means for driving said takeup spool includes switch means for driving said second motor means for taking up said tape when said first motor means is not in operation.

3. A recorder for recording signals transmitted from a remote station to the recorder at a central station, said recorder including a housing, a tape supply spool, a tape takeup signal-receiving a first motor means for feeding tape from said supply spool to said takeup spool, a second motor means for driving said takeup spool to wind said tape thereon, a plurality of signal-receiving means in said housing each having means for receiving signals transmitted thereto from a remote station, means on said signal-receiving means for recording on said tape signals received by said signal-receiving means, means for recording on said tape the date and time that said signal is received by said signal-receiving means and recorded on said tape, means responsive to the signal received by said signal-receiving means for driving said first and second motor means for feeding said tape from said supply spool onto said takeup spool while signals are being received and for disconnecting said drive at a predetermined time interval after said signals are received, and means for preventing continuous operation of said recorder under fault conditions.

4. A recorder, as recited in claim 3, in which said plurality of signal-receiving means each includes means for receiving a transmitted signal from a remote station when others of said signal-receiving means are inoperative by reason of fault conditions.

5. A recorder, as recited in claim 4, in which said means for driving said first and second motor are responsive to the first signal received by the first of said plurality of signal-receiving means to start said motor.

6. A recorder, as recited in claim 5, in which said means for driving said first and second motor are responsive to the last signal received by said plurality of signal-receiving means to disconnect said drive of said first and second motor at a predetermined time interval after said last signal is received.

7. A recorder, as recited in claim 2, in which said means for recording on said tape the date and time that said signal is received includes means for repeating the recording of the date and time at predetermined time intervals thereafter as said tape continues to be driven.

8. A recorder, as recited in claim 4, including test means for driving and stopping said tape when signals are not being received.

9. A recorder for recorder for recording signals transmitted from a remote station to the recorder at a central station, said recorder including a housing, a tape supply spool, a tape takeup spool, a first motor for feeding tape from said supply spool to said takeup spool, a second motor for driving said takeup spool to wind said tape thereon, an alternating current power supply, means for supplying alternating current from said alternating current power supply to said first motor and said second motor, a plurality of signal-receiving means in said housing each having means for receiving signals transmitted thereto from a remote station, a direct current power supply for providing direct current to said signal-receiving means, means on said signal-receiving means for recording on said tape signals received by said signal-receiving means, means for preventing continuous recording on said tape of signals received by said signal-receiving means because of fault conditions, means for recording on said tape the date and time that said signal is received by said signal-receiving means and recorder on said tape, means responsive to the signal received by said signal-receiving means for driving said first and second motors for feeding said tape from said supply spool onto said takeup spool while signals are being received and for discontinuing said drive at a predetermined time interval after said signals are received and means for supplying current from said direct current power supply for providing current to said first and second motors upon failure of said alternating current power supply.

10. A recorder as recited in claim 9, in which said means for supplying current from said direct current power supply for providing current to said first and second motors includes a direct current to alternating current inverter.

11. A recorder as recited in claim 10, in which said means for supplying direct current from said direct current supply for providing current to said first and second motors includes means for disconnecting said means for recording the date and time while current is fed to said first and second motors from said inverter.

12. A recorder as recited in claim 11, in which said first motor for feeding said tape is a direct current stepping motor which, when supplied with alternating current, advances said tape with each positive and each negative alternating current impulse a fixed amount.

* * * * *

UNITED STATES PATENT OFFICE
CERTIFICATE OF CORRECTION

Patent No. 3,618,116　　　　　　　　　　Dated　November 2, 1971

Inventor(s)　Anthony C. LaMartina, Jr. and Floyd Malmborg

It is certified that error appears in the above-identified patent and that said Letters Patent are hereby corrected as shown below:

First page, Inventors - "Anthony C. Jr. LaMartina" should be -- Anthony C. LaMartina, Jr. --;

Col. 1, line 45 - insert after tape -- . --;

Col. 4, line 32 - "Where" should be -- When --;

Col. 4, line 32 - after energized insert -- , --;

Col. 4, line 33 - after Yl (second occurrence) insert -- , --;

Col. 4, line 43 - "linked" should be -- inked --;

Col. 5, line 3 - "designated" should be -- design --;

Col. 5, line 61 - "retrips" should be -- re-trips --;

Col. 6, line 32 - delete "signal-receiving" and insert -- spool --.

Signed and sealed this 13th day of June 1972.

(SEAL)
Attest:

EDWARD M. FLETCHER, JR.　　　　　　　　ROBERT GOTTSCHALK
Attesting Officer　　　　　　　　　　　Commissioner of Patents